Feb. 9, 1932.  J. HAAS  1,844,359
IDENTIFICATION TAG
Filed Nov. 22, 1930
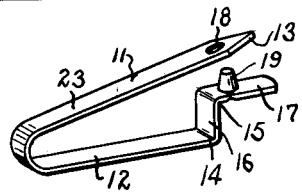
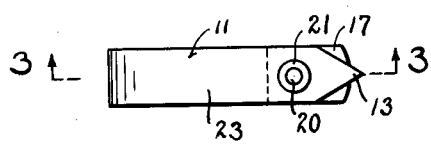  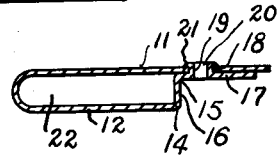
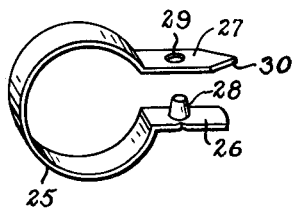
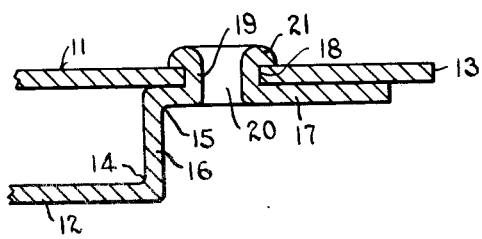
INVENTOR.
JOSEPH HAAS.

Patented Feb. 9, 1932

1,844,359

UNITED STATES PATENT OFFICE

JOSEPH HAAS, OF NEWPORT, KENTUCKY

IDENTIFICATION TAG

Application filed November 22, 1930. Serial No. 497,419.

This invention relates to an improved tag, which is adapted to be attached to the wing of a fowl or may be applied to the ear of an animal by forcing the pointed end of the tag through the wing or ear and then bringing the two ends of the tag into parallelism and clamping the same together.

The object of the invention is to provide a tag of this character, formed to the desired shape, which can be readily inserted in the wing or ear and having the two ends meet in parallel relation for readily securing the ends together.

A further object is to provide the tag with an offset portion, whereby the clamped ends meet in parallel relation.

The invention will be further readily understood from the following description and claims, and from the drawings in which latter:

Fig. 1 is a perspective view of the tag in open position.

Fig. 2 is a plan view of the tag in sealed position.

Fig. 3 is a cross-sectional view of the same, taken on the line 3—3 of Fig. 2.

Fig. 4 is an enlarged detail of the clamping means.

Fig. 5 is a perspective view of a modified form.

My improved tag is formed from a single strip of flexible metal bent into a U-shape to form an upper member 11 and a lower member 12. The end of the upper member is pointed as at 13, for readily piercing the web of a wing or the ear of an animal without the aid of a piercing tool or other implement for forming a hole in the wing or ear. The lower member is bent at 14 and 15 to form an upright extension 16 and a flat end 17 in a plane parallel to the lower member.

The upper member 11 is provided with a hole or eye 18 which is preferably round. The end 17 of the tag is provided with a stud 19 which is preferably punched out of the strip and is open at the top as at 20, although any suitable rivet or clinching means may be employed to secure the ends together without departing from the scope of my invention.

In applying the tag to the wing of a fowl, the pointed end of the tag is forced through the wing web which joins the arm and forearm of the wing. The upper portion of the tag is pressed down, causing the stud 19 to enter the hole 18. The stud is clinched as at 21 by means of any suitable clinching tool for sealing the tag. The upper and lower portions of the tag are thus brought into substantially parallel relation with a space 22 between the members. Suitable identification marks can be impressed on the face 23, or on any of the flat surfaces of the tag.

The tags are usually applied to the wing when the fowls are very young and the space 22 permits the natural growth of the wing.

In the modification shown in Fig. 5, the body 25 of the tag is of circular formation with the ends 26, 27 in substantially parallel relation. The lower end 26 is provided with a punched up stud 28 and the upper end 27 is provided with a hole 29 for co-operation with the stud. The end 27 is pointed as at 30 for insertion in the wing.

Having thus fully described my invention what I claim as new and desire to secure by Letters Patent, is:

1. An identification tag comprising a flat upper member and a lower member, said upper member having a pointed end, said lower member provided with a flat base portion and an offset adjacent to its end, whereby, when said members are engaged, said upper and lower members will be substantially parallel with a space between said members.

2. An identification tag comprising a flat upper member and a lower member, said upper member having a pointed end, said lower member provided with a flat base portion and an offset adjacent to its end, one of said ends provided with a stud and the other with a co-operating opening for engaging said members in substantially parallel relation.

3. An identification tag comprising a metallic band bent into a U shape having a flat upper member pointed at its end and a lower member having a flat base portion bent at right angles near its end and provided with an extension parallel to said base portion.

4. An identification tag comprising a metallic band bent into a U shape having a flat upper member pointed at its end, a lower member having a flat base portion bent at right angles near its end and provided with an extension parallel to said base portion and said upper member and said extension provided with an opening and a rivet respectively for securing said members together.

In testimony whereof I have hereunto signed my name.

JOSEPH HAAS.